Sept. 14, 1948.
G. H. HUFFERD
REVERSIBLE PUMP CONTROLLED
HYDRAULIC CYLINDER SYSTEM
2,449,482
Filed March 12, 1945
3 Sheets-Sheet 1
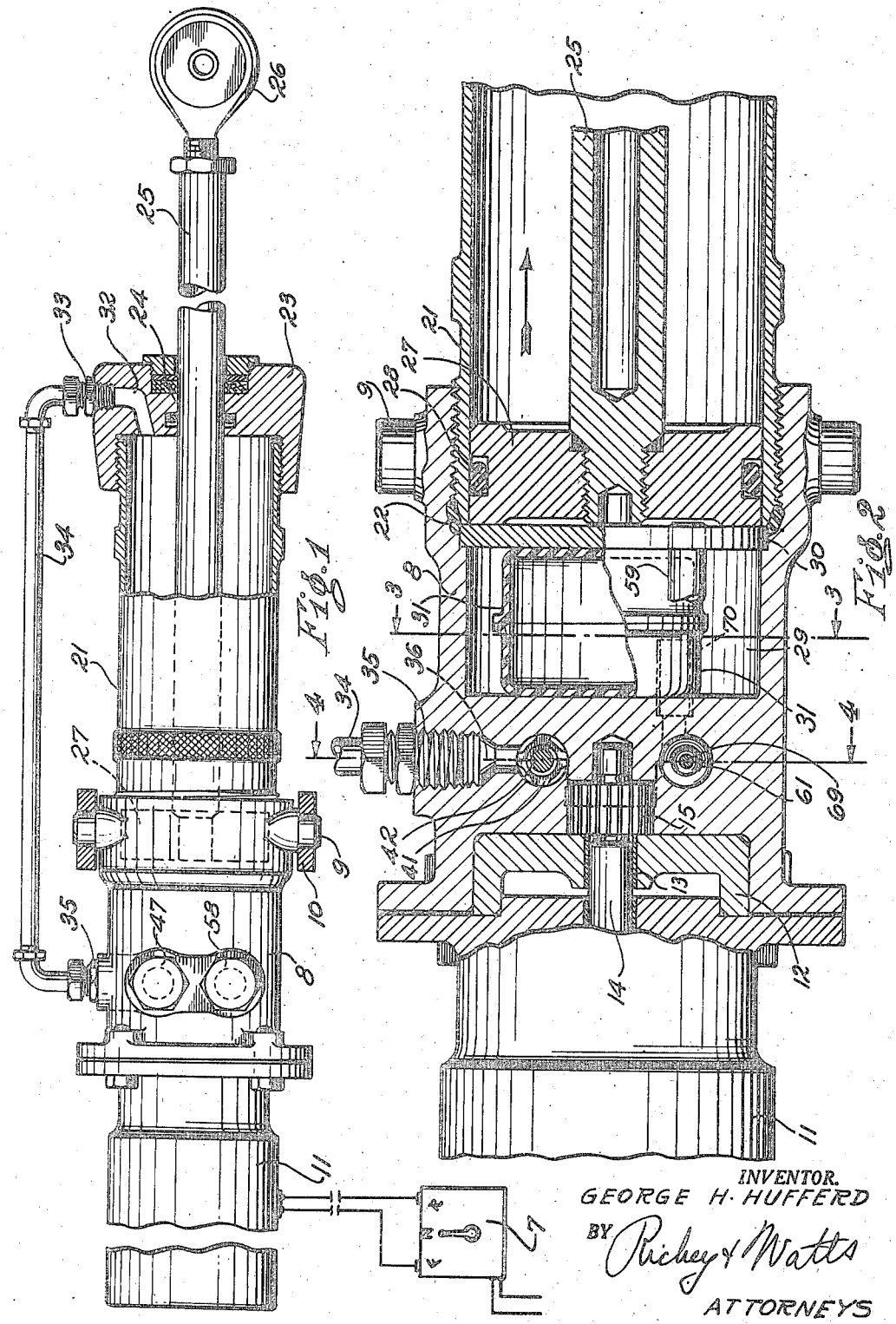
INVENTOR.
GEORGE H. HUFFERD
BY Richey & Watts
ATTORNEYS INVENTOR.
GEORGE H. HUFFERD
BY Richey & Watts
ATTORNEYS Patented Sept. 14, 1948

2,449,482

UNITED STATES PATENT OFFICE 2,449,482

REVERSIBLE PUMP CONTROLLED HYDRAULIC CYLINDER SYSTEM

George H. Hufferd, Shaker Heights, Ohio, assignor to The Weatherhead Company, Cleveland, Ohio, a corporation of Ohio Application March 12, 1945, Serial No. 582,317

6 Claims. (Cl. 60—52)

My invention relates to hydraulic apparatus and concerns particularly hydraulic operators useful for actuating any one of many mechanical devices dependent for their operation on reciprocating motion.

A general object of my invention is to provide a hydraulic operating system and method obviating the necessity for a fluid pressure supply from a central point under considerable pressure. In this connection it is an object of my invention to eliminate a hazard of rupture of supply piping from such a central source, whether such rupture takes place by accident, wear and tear, or by destructive intent as in the case of apparatus subject to enemy shell fire.

An object of the invention is to provide an arrangement with means for effecting operation by reciprocating a rod hydraulically and with means for arresting and holding or locking the rod in any desired limiting or intermediate position.

A further object is to provide a hydraulic operator arrangement for use where great reliability is required, such as in aviation construction, for example, where members such as rudders, ailerons, elevators, landing gear and the like may be controlled by hydraulic pistons and rods.

The utility of the invention is not limited to the foregoing examples, and generally speaking it is an object of my invention to provide a hydraulic operator or method of operation for any suitable need where fluid pressure supply is generated at the point of application only, and its use is controlled from a remote point with little likelihood of interference or interruption.

A further object is to provide means for selectively actuating a hydraulic operator in either direction of reciprocation without reliance upon manually or mechanically operated supply valves.

Still another object of my invention is the provision of electrical means for actuating a hydraulic operator in either direction of reciprocation and from a remote position. Thus an object is the provision of an electrohydraulic operator.

More specifically an object of my invention is to provide means for arresting and locking an operator in an adjusted position intermediate the ends of its travel, as well as at the ends of its travel, and to provide for subsequent reciprocation of the operator in either direction from such an intermediate position.

A further object of my invention is to maintain pressure fluid in a closed circuit including a cylinder having a piston therein secured to a rod extending through one end of the cylinder, and to take up the difference in volume of the two ends of the cylinder due to the inclusion of the rod in one end.

Still another object of the invention is to provide a rugged and durable mechanism which may be subjected to severe operating conditions without damage and which is economically manufactured and easily assembled and serviced.

Other and further objects, features and advantages will become apparent as the description proceeds.

In carrying out the invention in a preferred form thereof I provide a casing containing a cylinder and piston and having a preferably reversible fluid pump mounted preferably upon the casing and directly driven by a preferably reversible electric motor. A rod to be operated is connected to the piston and fluid conducting piping from the pump is connected to the opposite ends of the cylinder for moving the piston in one direction or the other according to which end of the cylinder is connected to the higher pressure side of the pump. Preferably valve means operated by the fluid pressure are provided for selectively connecting the high pressure side of the pump to either fluid-conducting piping.

A better understanding of the invention will be afforded by the following detail description considered in conjunction with the accompanying drawings and its scope will be set forth in the claims.

In these drawings—

Fig. 1 is a side elevation partly in section of my improved electro-hydraulic operator for rods and the like;

Fig. 2 is an enlarged longitudinal section of a portion of the apparatus of Fig. 1, a portion of the pressure bag and the partition supporting certain conduits being shown in elevation;

Like reference characters are utilized throughout the drawing to designate like parts.

Figure 3:
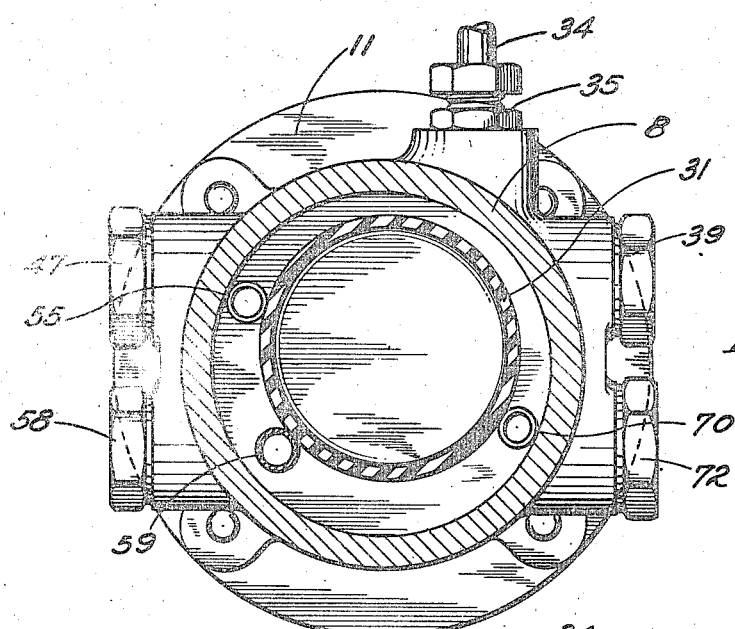
Fig. 3 is a transverse section of the accumulator or reservoir taken on the line 3—3 of Fig. 2.

For illustrating the invention, there is shown in Fig. 1 an embodiment of the invention taking the form of apparatus for longitudinally moving a rod 25 between two end positions and locking it at either end position or at an intermediate position. The apparatus illustrated comprises a structure including or formed as a hollow cylinder, identified by the numeral 21, in which a piston 27, secured to the rod 25, is adapted to reciprocate. A pump 15 is provided, which is preferably of a reversible type such as a gear pump, for example. For driving the pump 15 an electric motor 11 is preferably directly connected thereto and the motor also is preferably reversible. Means are provided for connecting the pump 15 to the cylinder 21 on either side of the piston 27. Such means may take the form of a tube 34, and channels to be pointed out hereinafter in connection with a description of the specific details of the apparatus. Suitable valves such as poppet valves 41, 48, 61 and 67 are provided for selectively controlling admission of fluid from the outlet or high pressure side of the pump to either end of the cylinder and these valves are adapted to be operated by the fluid pressure of the pump as will be explained more in detail hereinafter.

To facilitate manufacture, the structure shown in Fig. 1 is preferably produced by fabricating a number of separate parts and assembling them. A casing 8 may be provided for carrying the other parts of the structure. To form the piston receiving cylinder, a cylindrical shell 21, sealed by gasket 22, may be threaded onto the casing 8 at one end, with a cylinder head 23 threaded onto the shell 21 at the other end, with a cylinder head 23 threaded onto the shell 21 at the other end and suitably sealed thereto. For pivotally supporting the structure, the casing 8 may be provided with trunnions 9 journalled in fixed bearings 10 forming a part of a suitable stationary support (not shown). The motor 11 is preferably bolted to one end of the casing 8 for compactness of assembly.

The motor 11 is preferably a relatively high speed motor, for example, one operating at approximately 5800 R. P. M. full load speed. For causing the motor 11 to run in either direction or remain at a standstill, a suitable reversing controller 7, which may be mounted at a distance, is provided having forward, reverse and standstill positions "F," "R," and "N," respectively. It will be understood that such controllers include connections for reversing the absolute or the relative polarities of the electrical energy in some part of the motor 11.

In order to form a fluid pump reversible in direction of flow with reversal in direction of rotation of the motor 11, a rotary type of pump such as a gear pump is preferably employed. Both the motor and the pump are made a part of a unitary structure and the assembly is as compact as possible to minimize the number of hydraulic lines, avoid moving pipe joints and provide a maximum degree of reliability. To this end a packing 12 is inserted between the casing 8 and the motor 11, carrying a central bearing 13 for a common motor and pump shaft 14. A toothed pump-gear 15 is keyed on the shaft 14. A two-part pump chamber 16 is formed in the casing 8, with one part of the pump chamber occupied by the pump gear 15. A complementary, meshing pump gear or idler 18 is provided which occupies the other part of the pump chamber 16, and is mounted loosely on a stub shaft 17.

Inlet and outlet or low-pressure and high-pressure ports 19 and 20 are provided for the gear pump, one or the other being the outlet port, depending upon the direction in which the pump gears are rotated.

The cylinder head 23 is provided with an aperture 24 for a rod 25 secured to the piston 27. For connecting the piston rod 25 to any suitable mechanical element which is to be operated, an attaching eyebolt 26 may be provided. As shown on Fig. 2, a piston ring or packing 28 is preferably provided for the piston 27, which is fully reciprocable in the hydraulic cylinder 21.

In order to avoid starving the gear pump, a reservoir chamber or accumulator 29 for hydraulic fluid is preferably provided in the casing 8 back of the cylinder 27 and separated from the latter by a partition 30. The casing 8 is so formed that the partition 30 is held against a shoulder by the inner end of the cylindrical shell 21 and the same packing or gasket 22 seals both the partition 30 and the cylinder. For the sake of compensating for variations in quantity of fluid temporarily stored in the accumulator 29, a gas bag 31 of flexible material, preferably elastic such as rubber is provided. The bag 31 is adapted to occupy the greater portion of the chamber 29 and is filled with gas so as to expand or contract with variations in pressure of the fluid pumped into the chamber 29 around the bag.

Means are provided for enabling one of the pump ports 20 to be connected to the far end of the cylinder 21. For example, a passageway 32 may be formed in the cylinder head 23 and I may provide a fitting 33, a tube 34 connected to the passageway 32 by the fitting 33 and a fitting 35, connecting the tube 34 to a passageway 36 in the casing 8.

As already pointed out, valves 41, 48, 61 and 67 are provided for controlling the pump connections to the cylinder 21. Chambers for such valves are formed in the casing. Thus there are two aligned valve chambers 38 and 43 extending across the casing below the passageway 36 above the gear pump and two aligned valve chambers 57 and 63' below the gear pump. A connecting opening 37 is provided between the chambers 38 and 43, and the chamber 38 is open to the passageway 36 from the pipe 34. The intermediate connecting opening 37, in turn, is open to the pump port 20. The end of the chamber 38 adjacent the connecting opening 37 forms a valve seat and the opposite or outer end is closed by means of a screw plug 39 and a gasket 40.

The valve 41 slides freely longitudinally in the chamber 38. The valve has a conical head and grooved sides and is intended to seat against the end opening of the chamber 38. The rear of the valve is provided with a stem 42 which is surrounded by a coiled compression spring 43. This spring tends to hold the valve upon its seat and the extent of the maximum opening is determined by the spacing between the end of the stem 42 and the screw plug 39.

Figure 4:
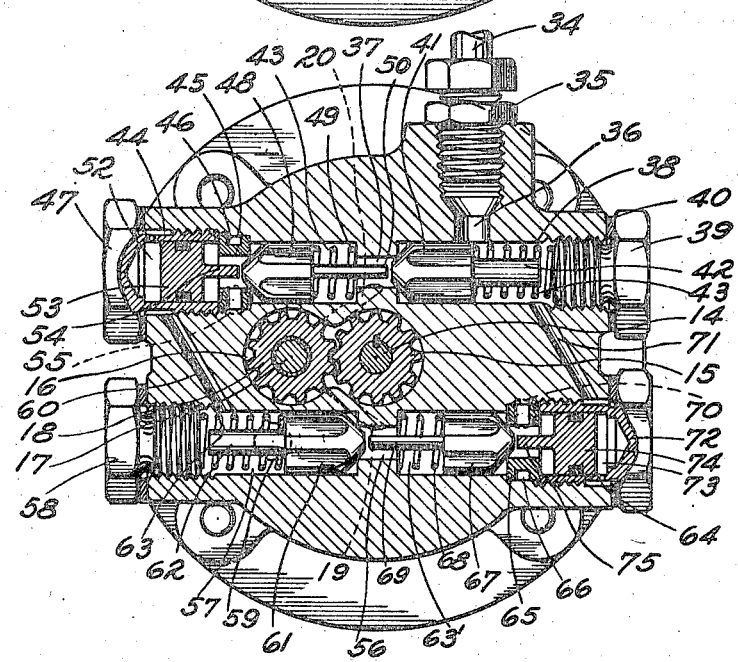
Fig. 4 is a transverse section of the actuating mechanism in locking position taken on the line 4—4 of Fig. 2.

The second aligned chamber has a bore 43 leading off from the connecting opening 37. Adjacent the bore 43 is a larger bore 44. A removable valve seat 45 fits in the larger bore against the shoulder formed by the smaller bore. It forms a seat for the valve member 48 and has a peripheral groove 46 connected at one point to the central bore of the valve seat 45 as shown in Fig. 4.

The large bore 44 of this chamber is closed by a gasketed hollow screw plug 47 which fits against the valve seat 45. The valve 48 in the small bore 43 has a conical head fitting against the valve seat 45. The valve has grooved sides to allow the fluid to pass in either direction. A compression spring 49 holds the valve against its seat. The rear of the valve has a shifting pin or stem 50, This extends through the connecting opening 37 and when the valve 48 is open the stem 50 contacts the end of valve 41 and opens the latter.

Figure 5:
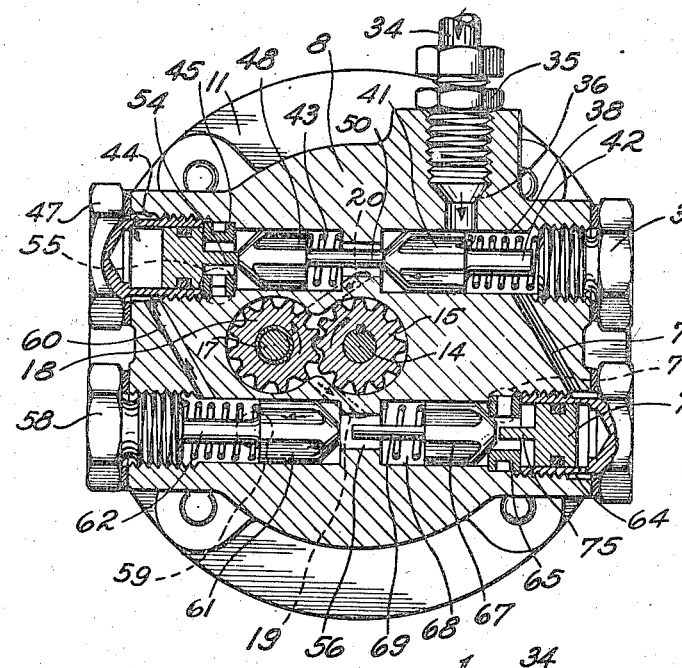
Fig. 5 is a similar transverse section showing the mechanism in position to advance the rod.
Figure 6:
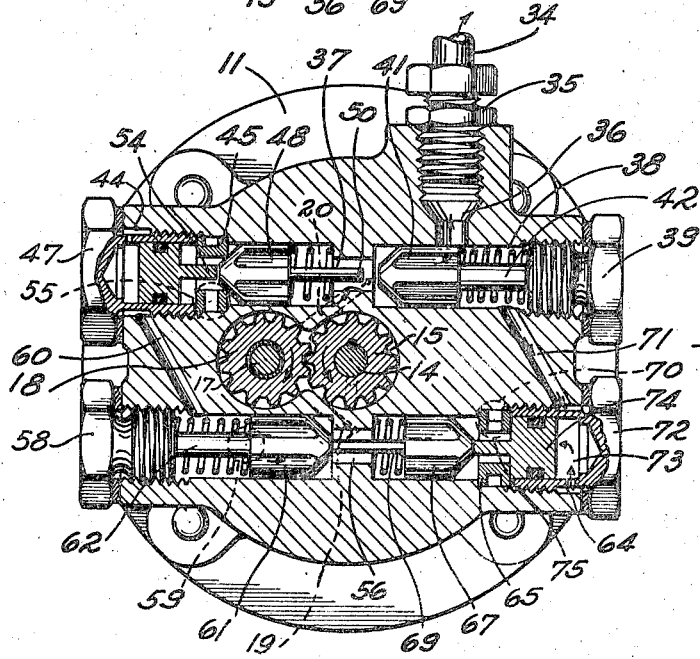
Fig. 6 is a similar transverse section showing the mechanism in position to retract the rod.

In the hollow screw plug 47 there is a chamber 52 vented as indicated into the large bore 44. The hollow screw plug forms a chamber in which a free piston 53 is adapted to reciprocate. This piston has a valve shifting pin 54 projecting through the valve seat 45 and operating against the head of valve 48. A pipe 55 in the casing connects the chamber 29 with the peripheral groove 46 and thus provides communication between the reservoir and the central space in the valve seat 45. The position of pipe 55 is indicated on Figs. 4–6, and the end of the pipe can be seen in Fig. 3 which is a section through the reservoir chamber 29.

The second pair of valve chambers is disposed in alignment across the casing below the gear pump and parallel to the first pair of chambers. These latter valve chambers have a connecting passageway 56 which is likewise at the lower end of the pump tube 19. One of these valve chambers 57 is closed by the gasketed screw plug 58 at its outer end. A port 59 and passage way extend from this chamber entirely through the reservoir 29 and the partition 30 and open into the hydraulic cylinder back of the piston 27. A small passageway 60 connects the large bore 44 with chamber 57.

A valve 61 with a conical head reciprocates in chamber 57 and is seated against the opening 66. The valve 61 has a rear stem 62 which limits its retraction against the screw plug 58. A compression coil spring 63 serves to hold the valve normally closed.

The fourth valve chamber in alignment with chamber 57 is shown to have a small bore 63' connecting with the passageway 56. The small bore leads into a large bore 64. The latter contains an annular valve seat member 65 resting against the shoulder of the small bore. A peripheral groove 66 is provided for the valve seat and is connected at one point to the central space in the valve seat. The valve 67 slides in the small bore and is seated against the annular valve seat 65. There is a coil compression spring 68 back of the valve 67 and surrounding a valve shifting pin 69. The latter extends through the passage way 56 and operates against the end of valve 61.

A pipe 70 leads from the peripheral groove 66 into the reservoir 29. This pipe as well as pipe 55 extend well into the reservoir so as to support the gas bag 31 and prevent the latter from blocking their ends.

A passageway 71 connects the large bore 64 with the chamber 38 of the valve first above described. The large bore 64 is closed by means of a hollow screw plug 72. This forms a vented chamber 73. The chamber slidably carries a free piston 74 which has a central valve shift pin 75. The latter projects through the annular valve seat 65 and operates against the face of the valve 67.

It will be evident that by the above described construction the hydraulic operating circuit can be restricted to the immediate vicinity of the reciprocating mechanism. The hydraulic means can be directed or operated in either direction or can be locked in any desired limiting or intermediate position solely by reversing the flow of electric current to a winding of the motor or by stopping this flow when the desired travel has occurred. Consequently the arrangement serves the prime purpose of providing the advantages of a flexible hydraulic cylinder operation with the merits and safety of electrical direction and operation. As has been already pointed out this is of particular benefit in the several operations of airplane control.

The arrangement provides cooperating elements combined to form an efficiently operating mechanism for reciprocating motion. The device is economically manufactured and easily assembled and serviced. It is rugged and durable and may be subjected to severe operating conditions without damage.

In the locked position as shown in Fig. 4 and when there is no back pressure in either direction, the liquid is in balance on both sides of the piston 27. The reservoir ports 55 and 59 are both open. Valve 41 is closed by the spring 43. There being no back pressure there is no effect through passageways 34, 36, 38 and 71 on the unloading piston 74 in the lower valve. Consequently valves 67 and 61 are held closed by springs 68 and 63. Valve 48 is closed by spring 49 as there is no back pressure through passageway 59. The valve 61 is closed by the spring 63 there being no back pressure from the reservoir 29 through pipe 70. There is thus no effect on the unloading plunger 74.

In the event there is back pressure exerted through pipe 59 from behind working piston 27, then this pressure is applied against the back of valve 61 without effect on it. The pressure also works through passageway 60 and back of free piston 53 to unseat valves 48 and 41. In the absence of pump action this can serve only to connect the reservoir 29 through the pipe 55 to the front of the piston 27 by way of pipe 34. This may transfer fluid to the forward side of the working piston 27 but will not be sufficient to add materially to its backward pressure.

When back pressure occurs from in front of the working piston 27, then it is transmitted through pipe 34 and against closed valve 41 without effect. Some pressure is then applied through 71 to unseat valves 67 and 61. The former thus connects the reservoir 29 to the near side of working piston 27 through pipe 59. Again no material effect will modify the back pressure on the opposite side of the working piston 27.

Assuming the working piston is balanced then in order to advance the operating rod 25 the pump must rotate upwardly, outwardly, and downwardly drawing liquid from the upper port and opening valve 61 against its spring. Liquid pressure delivered around piston 61 is discharged through 59 to the cylinder back of the piston 27 and causes the latter to advance. At the same time the liquid pressure travelling up through pasageway 60 builds up pressure against free piston 53 and opens valve 48 to permit discharge from pipe 55 to supply the pump. Pin 50 opens valve 41 to allow liquid to return through pipe 34 and thus supply the pump.

In this operation the fourth or lower right hand valve in Fig. 4 is inactive.

As soon as the pumping is suspended, pressure back of the operating pistons is relieved and the valves return by spring operation to their closed position.

In the retracting movement the pump operates in the reverse direction, namely, downwardly through the center, out and upward. Pressure is thus delivered to valve 41 compressing the spring 43 and delivering liquid under pressure through 34 to the front of piston 26 thus retracting the latter.

The pressure delivered through valve 41 also traverses passageway 71 which operates the unloading or shifting piston 74 so that valve 67 is raised from its seat. Excess liquid is delivered through pipe 70 to the reservoir compressing the gas bag. At the same time pin 69 opens valve 61 and allows the liquid to discharge through passageway 59 from in back of the piston 27 to the passageway 70 and the reservoir 29. As soon as the pump stops the springs close the valves in the manner already described and thus preserve balanced pressure on the opposite sides of the piston 27 forcing the latter to remain stationary.

Should there be back-pressure on working piston 27 tending to advance it, then the following action would occur when the pump is actuated to retract the piston.

The back-pressure occurring in pipe 59 would normally open valve 41 (by pressure through passageways 57 and 60 acting upon elements 52, 54, 48, 50 and 41). This would merely anticipate the delivery of the pressure fluid from the pump through valve 41 and pipe 34 to the front of the working piston 27 and thus effect its retraction.

In summary the arrangement above described utilizes the advantageous hydraulic operating mechanism for a reciprocating member and at the same time insures this hydraulic system against undue risk of damage through the use of extended piping. This result is accomplished by providing an electric control circuit which operates a reversible electric motor direct-connected to the fluid-pressure pump adjacent the piston cylinder of the operating rod.

Furthermore the arrangement is such that the direction and pressure of the fluid coming from the pump controls the opening of the appropriate valve leading to the side of the piston cylinder on which the pressure is to be applied. At the same time the pressure is used to unseat the check valve on the pump feeding side and facilitate the draught of fluid both from the leading side of the main piston and from the accumulator.

The arrangement utilizes a pressure pump which works in either direction to force fluid to the power cylinder through one of two spring-held valves. These valves prevent reverse flow. The valves are mechanically unseated by pressure exerted from the opposite side of the pump through check valves and valve unloaders. One valve and a corresponding check valve cooperate in each direction of pumping to supply the pump while in the opposite direction they operate independently to deliver high-pressure fluid to the power cylinder but prevent its escape to the accumulator.

Having thus described my invention so that others skilled in the art may be able to understand and practice the same, I state that what I desire to secure by Letters Patent is defined in what is claimed.

What I claim is:

1. In combination, a casing having a cylinder, a piston reciprocable therein, a rod operated by the piston, a reversible fluid pump mounted adjacent the cylinder, fluid conducting piping from the pump to opposite ends of the cylinder, spring held power valves for selectively connecting the high pressure side of the pump to either fluid conducting piping, an accumulator chamber in the casing and having passages connected to both sides of the pump, a spring held check valve in each passage, a free piston operable by pressure from the opposite side of the pump to open each check valve, and means on each check valve to open the corresponding power valve.

2. In combination, a casing having a cylinder, a piston reciprocable therein, a rod operated by the piston, a reversible fluid pump mounted adjacent the cylinder, fluid conducting piping from the pump to opposite ends of the cylinder, spring held power valves for selectively connecting the high-pressure side of the pump to either fluid-conducting piping, an accumulator chamber in the casing and having passages connected to both sides of the pump, a spring-held check valve in each passage and aligned with a power valve, a free piston also aligned with said two first named valves and operable by pressure from the opposite side of the pump, means on the free piston to open the check valve, and means on the check valve to open said power valve.

3. In combination, a casing having a cylinder, a piston reciprocable therein, a rod operated by the piston, a reversible fluid pump mounted adjacent the cylinder, fluid conducting piping from the pump to opposite ends of the cylinder, spring-held power valves for selectively connecting the high-pressure side of the pump to either fluid-conducting piping, an accumulator chamber in the casing and having passages connected to both sides of the pump, a spring-held check valve in each passage, a free piston operable by pressure from the opposite side of the pump to open each check valve, means on each check valve to open the corresponding power valve, and a compressible element in the accumulator chamber.

4. In combination a pair of cylinders, a piston portion in each cylinder, a reversible pump, fluid conduits between the pump and each cylinder, spring held power valves for selectively connecting the high pressure side of the pump to either cylinder, a reservoir, means connecting said reservoir to both sides of said pump, a check valve in each of said connecting means, a free piston operable by pressure from the opposite side of the pump to open each check valve, and means on each check valve to open an associated power valve.

5. In combination a pair of cylinders, a piston portion in each cylinder, a reversible pump, fluid conduits between the pump and each cylinder, spring held power valves for selectively connecting the high pressure side of the pump to either cylinder, a reservoir, means connecting said reservoir to both sides of said pump, a spring held check valve in each of said connecting means and aligned with a power valve, a free piston aligned with each pair of said first two valves and operable by pressure from the opposite side of the pump, means on each free piston to open its associated check valve, and means on each check valve to open an associated power valve.

6. In combination a pair of cylinders, a piston portion in each cylinder, a reversible pump, fluid conduits between the pump and each cylinder, spring held power valves for selectively connecting the high pressure side of the pump to either cylinder, a reservoir, means connecting said reservoir to both sides of said pump, a spring held check valve in each of said connecting means and aligned with a power valve, a free piston aligned with each pair of said first two valves and operable by pressure from the opposite side of the pump, means on each free piston to open its associated check valve, and means on each check valve to open an associated power valve, and a compressible element in the accumulator chamber.

GEORGE H. HUFFERD.

REFERENCES CITED

The following references are of record in the file of this patent:

UNITED STATES PATENTS

| Number | Name | Date |
|---|---|---|
| 1,429,101 | Ross | Sept. 12, 1922 |
| 1,616,841 | Beebe | Feb. 8, 1927 |
| 1,690,181 | Sederholm | Nov. 6, 1928 |
| 1,940,668 | Ernst | Dec. 26, 1933 |
| 2,368,659 | Heineck | Feb. 6, 1945 |

FOREIGN PATENTS

| Number | Country | Date |
|---|---|---|
| 360,458 | Great Britain | Nov. 2, 1931 |
| 750,179 | France | May 22, 1933 |